United States Patent [19]

Foord et al.

[11] 4,093,342
[45] June 6, 1978

[54] OPTICAL FIBER CABLE

[75] Inventors: Stanley G. Foord, Harlow; Walter E. Simpson, Ware, both of England

[73] Assignee: International Standard Electric Corporation, New York, N.Y.

[21] Appl. No.: 742,676

[22] Filed: Nov. 17, 1976

Related U.S. Application Data

[63] Continuation of Ser. No. 626,073, Oct. 28, 1975, abandoned.

[30] Foreign Application Priority Data

Nov. 12, 1974 United Kingdom ............... 48859/74

[51] Int. Cl.² ................................. G02B 5/16
[52] U.S. Cl. ................................. 350/96.23
[58] Field of Search ............ 350/96 B, 96 R; 174/69, 174/70 R; 264/290 R, 290 N, 290 T

[56] References Cited

U.S. PATENT DOCUMENTS

| | | | |
|---|---|---|---|
| 3,564,835 | 2/1971 | Keefe, Jr. et al. | 264/290 N |
| 3,699,950 | 10/1972 | Humphrey, Jr. et al. | 350/96 B |
| 3,766,307 | 10/1973 | Andrew, Jr. | 350/96 B |
| 3,865,466 | 2/1975 | Slaughter | 350/96 B |
| 3,883,218 | 5/1975 | Slaughter | 350/96 B |
| 3,962,153 | 6/1976 | Gore | 264/290 R |

*Primary Examiner*—John K. Corbin
*Assistant Examiner*—Stewart Levy
*Attorney, Agent, or Firm*—Thomas L. Peterson

[57] ABSTRACT

An optical fiber cable in which elongation under longitudinal tension is reduced by the use of a molecularly oriented plastic reinforcement member extending along the neutral axis of the cable.

1 Claim, 1 Drawing Figure

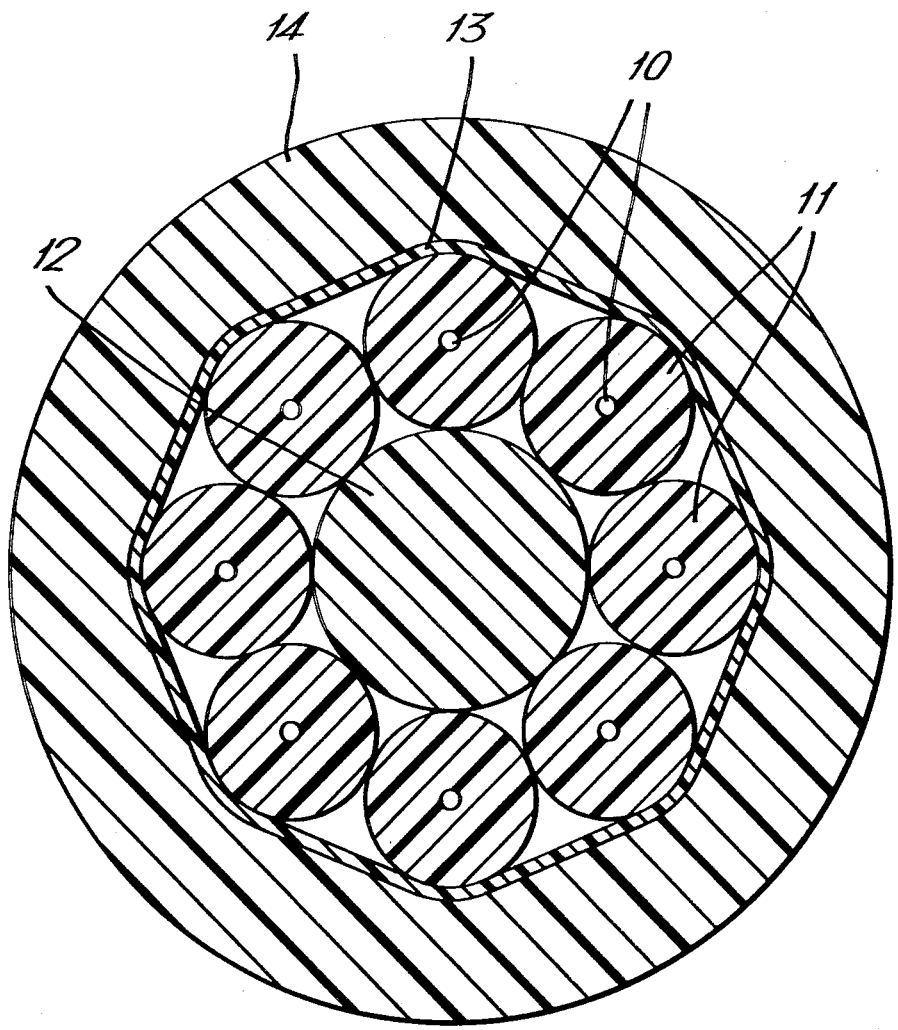

OPTICAL FIBER CABLE

This is a continuation, of aplication Ser. No. 626,073, filed Oct. 28, 1975, now abandoned.

BACKGROUND OF THE INVENTION

This invention relates generally to an optical fiber cable and, more specifically, to an optical fiber cable having a tensile reinforcement member.

Both single mode and multimode fibers may be assembled into cables. A typical single mode fiber may have a core diameter of about 2 µm and a cladding diameter of about 70 µm while a typical multimode may have a core diameter of about 60 µm and a cladding diameter of about 70 µm. Except for the case of liquid core fibers, core and cladding are generally made from materials having similar mechanical properties, and hence the mechanical properties of a single mode fiber will normally be similar to those of a multimode one made of the same core and cladding materials. Therefore, from the point of view of the mechanical considerations of cable making, there is little difference between the processing of both types when similar materials are used in their construction.

Glasses used for optical fiber manufacture include fused silica glasses, borosilicate glasses, and sode lime silicate glasses. Overall diameters of such fibers have evolved in part from optical requirements, but a limitation has been set by the brittle nature of the glass and the need to retain sufficient flexibility for incorporation in cables. Such fibers typically break at about 1-2% elongation when subjected to tensile stress, but behave elastically over most of the range of extension. This means that considerable stress can be applied without permanent deformation since the elastic moduli of glasses are high. However, as a result of their small cross-sectional area, the breaking tension of fibers is usually only of the order of a few hundred grams.

Some tensile reinforcement of individual optical fibers is therefore desirable merely to facilitate the laying up of a cable. This reinforcement may be provided by giving each fiber a plastic sheath. Such a sheath offers the possibility of further advantages, such as protecting the glass from chemical attack, and from damage by abrasion during winding and laying up operations. The sheath may also act to cushion the fiber from applied radial forces and give a measure of protection against the formation of kinks in the fiber of small radius of curvature. To take full advantage of some of these effects it would be desirable to use as thick a sheath as possible, but a compromise has to be reached in order to preserve adequate flexibility and to limit the total cross-sectional area of the cable for a given number of fibers.

When a system of parallel elements of uniform cross-section and equal length is extended, but not beyond the elastic limit of any element, the tension T developed is related to the strain S by the relationship:

$$T = S\Sigma EA$$

where E is Young's modulus of elasticity of an element and A is its cross-sectional area. In the case of a plastic sheathed glass fiber the equation becomes:

$$T = S(E_1A_1 + E_2A_2)$$

where the subscripts 1 and 2 refer to the glass and the plastic respectively. In this context it may be noted that it is immaterial whether the plastic is bonded to the glass provided that both materials are subjected to the same strain.

As a general rule, the elastic moduli of plastic materials are considerably lower than those of glasses, so that in order to make a significant contribution to the tensile strength the area $A_2$ must substantially exceed $A_1$. On the other hand, since the flexibility of a cylindrical rod is inversely proportional to $EA^2$, it is advantageous to keep $A_2$ as small as possible by using a plastic material with a large Young's modulus. Typically extruded plastic such as high density polyethylene (HDPE), polypropylene (PP), nylon, and polyethylene terephthalate (PETP) have moduli in the region of 150 to 200 kg/mm², but some nylons extruded under ideal dry conditions can have a modulus as large as 300 kg/mm, though this is liable to degenerate to around 150 kg/mm in a moist atmosphere.

Assuming a modulus of 7,000 kg/mm for a glass it may be shown that for a 70 µm diameter fiber the limit of 1% elongation is achieved at a tension of about 150 grams for a bare fiber. If, however, this fiber is sheathed in plastic material having a modulus of 300 kg/mm²1% elongation occurs at a tension of 1 kg for a 0.6 mm external diameter sheath and at a tension of 2.5 kg for a 1.0 mm external diameter sheath. For a lower value modulus of 150 kg/mm²1% elongation occurs at a tension of nearly 1.5 kg for a 1.0 mm external diameter sheath.

A tensile strength of the order of 1 kg is generally acceptable for the operations of cable making, such as bunching, stranding, braiding, sheathing, and armouring, but if the construction relies virtually exclusively on the sheathed fibers for its tensile strength, this strength is liable to be inadequate. In particular it is liable to be inadequate for withstanding the large force generally required to install cables in long ducts.

U.S. Pat. No. 3,883,218 to Slaughter teaches the disposing of sheathed optical fibers around a central tensile reinforcement member so that the strain on the fibers is reduced when the cable is stressed. The reinforcement member in the Slaugher patent is formed of steel and is therefore not as flexible as may be desired for some applications. Also, the fiber optic cable with a steel reinforcement member has a lower strength to weight ratio than desired for installation in ducts. Further, in certain military applications it is desirable to avoid the use of metal in a fiber optic cable. It is the purpose of the present invention to provide a fiber optic cable which overcomes the shortcomings of the above-described prior art cable, yet which still provides adequate protection of the optical fibers from undue stresses.

SUMMARY OF THE INVENTION

According to the principal aspect of the present invention, the central reinforcement member of a fiber optic cable is formed of a high tensile strength plastic whose elastic modulus has been increased by orienting the molecules thereof by stretching at a temperature below the melting point of the plastic. Such a cable has an improved strength to weight ratio over a metal reinforced fiber optic cable and is lighter and more flexible, thereby rending the cable more satisfactory for many applications than the prior art cable.

BRIEF DESCRIPTION OF THE DRAWING

The drawing illustrates the cable of the present invention is transverse cross-section.

DESCRIPTION OF THE PREFERRED EMBODIMENTS

According to the invention, a fiber optic acid cable is provided in which individually sheathed optical fibers are disposed around a plastic central tensile reinforcement member. The central location of the reinforcement member on the neutral axis of the cable ensures that the reduction in cable flexibility resulting from the stiffness of the reinforcement member is at a minimum. The maximum stress developed in the sheathed fibers during bending of the cable is also minimized by locating the reinforcement member of the neutral axis.

The reinforcement member is formed of a high tensile material whose elastic modulus has been increased by orienting the molecules by stretching at a temperature significantly below the melting point of the material. Oriented versions of plastic materials such as HDPE, PP, nylon, and PETP have Young's moduli lying typically in the range 1,500 to 4,000 kg/mm$^2$. This is still small compared with a modulus of about 20,000 kg/mm$^2$ for steel. However, steel has the disadvantage that the yield strain is little more than 0.1% is compared with a value usually in excess in 1.0% for plastic clad glass fiber. This makes it difficult to realize the full theoretical potential of steel.

The sheathed fibers are arranged in a helical configuration around the reinforcement member. This requires that the sheathing should have a low enough coefficient of friction to allow relative longitudinal motion between adjacent sheathed fibers. The pitch of the helix must be relatively long so that it introduces neither excessive curvature, nor excessive increase in optical path length.

Referring now to the drawing, there is shown a group of eight glass optical fibers 10, having an external diameter of 70 μm, have sheaths 11 or polyethylene terephthalate (PETP) extruded around them. The external diameter of the sheaths 11 is 1 mm. The eight sheathed fibers are wrapped around a plastic tensile reinforcement member 12 in a long helix, typically having a pitch of about 20 cm. The reinforcement member which has a diameter of about 1.6 mm is made of an oriented PETP.

The assembly of the sheathed fibers and the reinforcement member is wrapped with PETP tape, which provides a heat shield 13, and then a protective sheath 14 for instance of polyethylene or polyvinylchloride is extruded around the assembly.

The relatively high temperature needed for the extrusion of the plastic protective sheath 14 can present some problems with regard to the dimensional stability of the reinforcement member 12 if the heat shield 13 is not adequate. Oriented PETP, produced by stretching at a relatively low temperature well below the melting point, is liable to shrink if subsequently heated to a higher temperature. This problem of possible shrinkage can be alleviated by making the reinforcement member out of oriented material which has been subjected, after orientation, to a heat treatment designed to improve its dimensional stability.

In a modification of the above described construction the reinforcement member is made from a high tensile aromatic polymer. Recently such a polymer in the form of fibers has become available under the trademark KEVLAR. This exhibits a Young's modulus in the order of 10,000 kg/mm$^2$.

It is to be understood that the foregoing description of specific examples of this invention is made by way of example only and is not to be considered as a limitation on its scope.

It is claimed that:

1. An optical fiber cable comprising:
   a plurality of optical fibers disposed lengthwise around a high elastic modulus strength reinforcement member extending along the neutral axis of the cable;
   said reinforcement member consisting of a pre-stretched molecularly oriented plastic;
   a plastic tape wrapped about said fibers on said reinforcement member;
   an extruded plastic sheath surrounding said tape on said reinforcement member; and
   said plastic tape being of a material different than said sheath and being contiguous with said sheath, said plastic tape providing a heat shield for said reinforcement member so that shrinkage of said reinforcement member will not occur during extrusion of said plastic sheath.

* * * * *